(No Model.) 3 Sheets—Sheet 1.
W. C. SMITH.
CONTROLLER FOR ELEVATORS.

No. 519,459. Patented May 8, 1894.

WITNESSES.
P. B. Moser.
G. S. Schaeffer

INVENTOR
William C. Smith
by H. T. Fisher
ATTORNEY.

(No Model.) 3 Sheets—Sheet 2.

W. C. SMITH.
CONTROLLER FOR ELEVATORS.

No. 519,459. Patented May 8, 1894.

WITNESSES
R. B. Moser
G. S. Schaeffer

INVENTOR
William C. Smith
by H. I. Fisher
ATTORNEY.

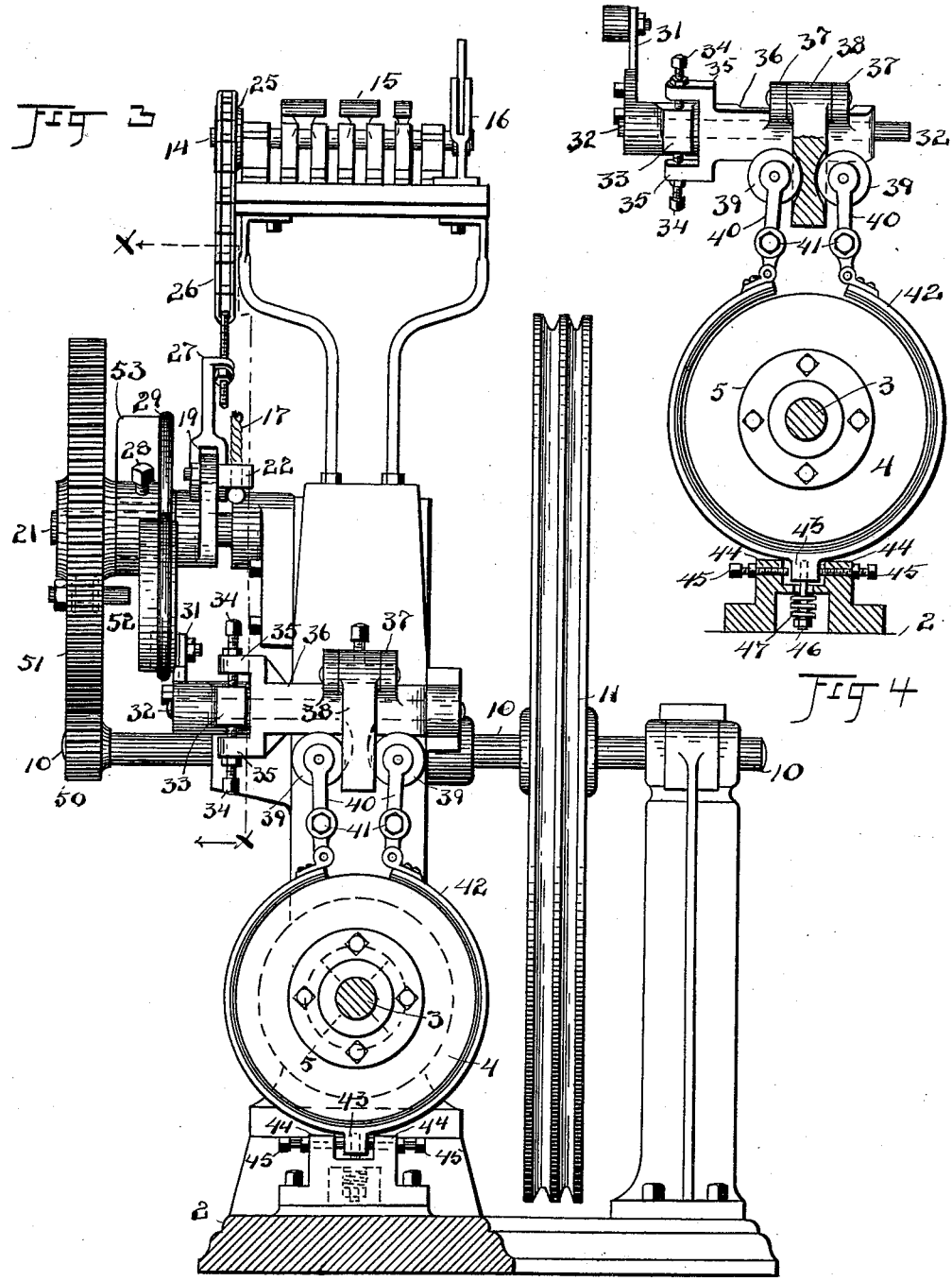

UNITED STATES PATENT OFFICE.

WILLIAM C. SMITH, OF CLEVELAND, OHIO, ASSIGNOR TO M. J. O'DONNELL & CO., OF SAME PLACE.

CONTROLLER FOR ELEVATORS.

SPECIFICATION forming part of Letters Patent No. 519,459, dated May 8, 1894.

Application filed March 6, 1893. Serial No. 464,705. (No model.)

*To all whom it may concern:*

Be it known that I, WILLIAM C. SMITH, a citizen of the United States, residing at Cleveland, in the county of Cuyahoga and State of Ohio, have invented certain new and useful Improvements in Controllers for Elevators; and I do hereby declare that the following is a full, clear, and exact description of the invention, which will enable others skilled in the art to which it appertains to make and use the same.

The object of my invention is to provide improved mechanism for controlling the movements of elevators.

Although my invention is especially adapted for use in connection with elevators propelled by electrical apparatus, it may be used with the same advantages with other means of propulsion.

The improvements consist of a construction of parts, and combinations thereof, that will greatly simplify such devices, enhance their durability, and insure a more certain, prompt, and desirable action in operation.

Figure 1:
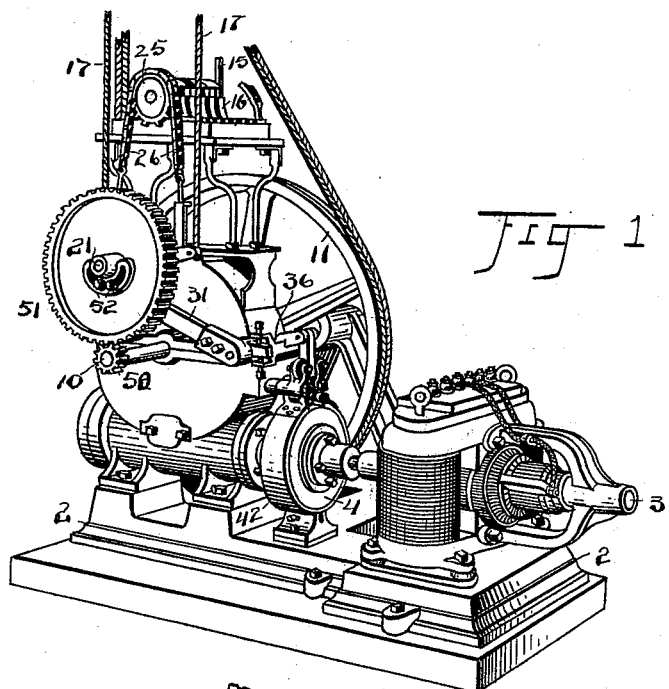
Figure 2:
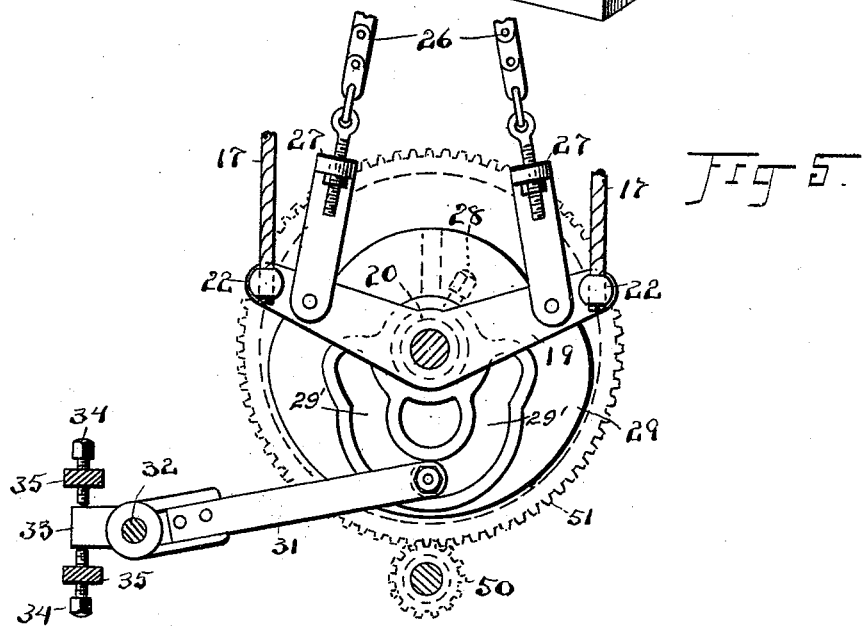
Figure 2:
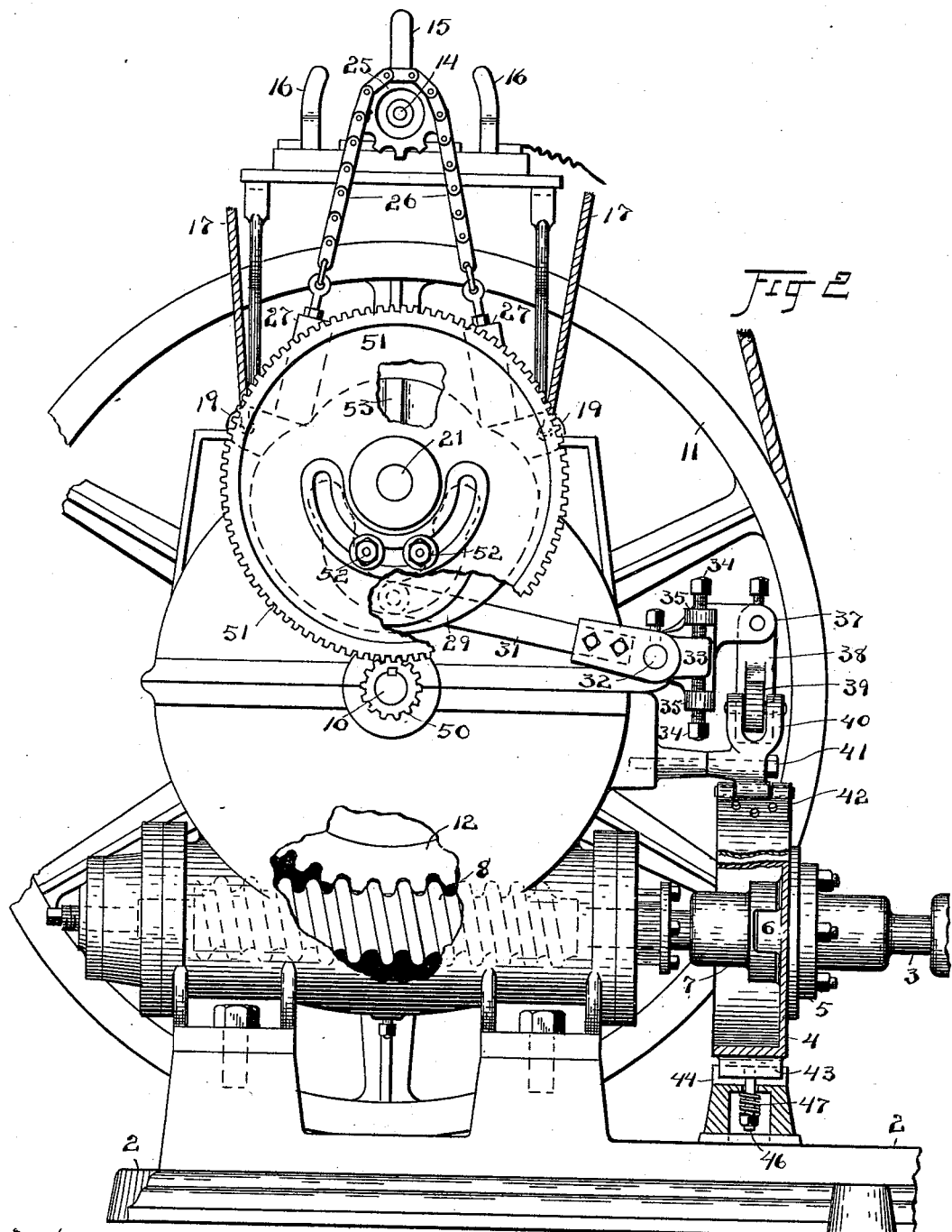

In the accompanying drawings forming a part of this specification and representing an embodiment of the invention, Figure 1 is a perspective view of my improved mechanism. Fig. 2 is an enlarged side elevation, showing the worm and gear wheels by which the cable wheel is operated through or from the motor shaft, and also portions of the controlling mechanism whereby the power is turned on or off and the brake applied to stop the motor, all as hereinafter separately and fully described. Fig. 3 is a front elevation of my improved mechanism. Fig. 4 is a detail of the brake; and Fig. 5 is a view showing the initial devices through which the brake is operated. This view is taken substantially on line *x*, *x*, Fig. 3.

In the drawings, 2 represents the base or foundation-frame, provided with suitable supports or bearings for an electric motor. This motor has an armature shaft 3 which extends inwardly to the flanged or hollow friction brake wheel 4, and the hub 5 of this friction brake wheel is constructed with projections 6 on its inner side, Fig. 2, adapted to engage with the correspondingly slotted head 7 of the worm shaft 8. This leaves the worm shaft or wheel 8 as free as may be needed for practical operation and at the same time makes a positive and continuous connection between the shaft of the motor and the said worm shaft, so that it is practically the same as if they were in a continuous piece. It of course follows that the worm 8 travels with the same speed and regularity as the armature and axle 3, and that both are stopped and started together.

At right angles to the worm gear or shaft 8 and some distance above the same, is the shaft 10, which carries the large grooved or channeled cable wheel 11 at one end and over which run the cables which carry the platform or cage of the elevator. This shaft likewise is supported upon suitable bearings extending from base 2, and has mounted upon it a large wheel 12, suitably incased and meshing with the worm wheel or gear 8, and serving to transmit power therefrom to the cable wheel 11. The relation of this wheel 12 to the said worm is clearly seen in Figs. 1 and 2. It follows, of course, that the direction of travel of the cable wheel is governed by the direction of rotation of the worm 8 and the motor, and the said motor and worm may be rotated in either direction and reversed from one direction to the other at the will of the elevator man on the platform or carriage. That is to say, if he wishes to go up, the motor is rotated in one direction; if to come down, the motor is rotated in the opposite direction, and the direction of travel is determined by the switch mechanism under the control of the elevator man. Obviously, too, if the elevator is to be stopped the current should be thrown off and the cable wheel 11 will then be held from turning in either direction when the motor stops, because the wheel 12 will be absolutely locked against turning.

Now in order that the electric current may be thrown on or off from the motor, or the motor reversed, I provide the switch mechanism shown clearly in Figs. 1 and 2. This mechanism consists primarily in the shaft 14 having brushes or projections 15 thereon, and arranged to swing to either side and touch the contact points or projections 16. When in the position seen in Fig. 2, the brush is out of contact at either side and the current is off the motor. Then when the brush is turned, say, to touch on one side, the motor will revolve in one direction, and when turned to the other side, the motor will revolve in the opposite direction. The shaft 14 is under control of the operator in the carriage through the cable or rope 17 connected at its ends with the rocking bar 19, which has a somewhat long extended hub 20, and is supported on and turns freely on the shaft 21. On the extremities of the rock bar 19 are lugs 22 on its inside in which the ends of the operating rope 17 are fastened, and this rope runs over a sheave at the top of the elevator shaft. Hence, if the operator pulls down on a portion or strand of this rope he will make contact on one side with the current controlling switch, and by pulling down on the other strand of the rope he will make contact on the other side and thus reverse the motor; or he can operate the rope so as to throw the switch out of contact and thus stop the motor as herein described.

The shaft 14 has a sprocket wheel 25 at one end and is operated by a chain 26 connected at its ends near the extremities of the rocking bar 19 by suitable link connections 27 in which the ends of the said chain are adjustable. Obviously equivalent means for connecting the switch with the rocking bar 19 may be employed and I do not wish to be confined in this particular to the exact mechanism and construction herein shown and described. Upon the same shaft with the rocking bar 19 at one side thereof and sleeved on the hub of said bar and held rigid therewith by means of a set screw 28, is the cam 29 having communicating grooves 29' 29' formed symmetrically with respect to the axis of the cam, as shown clearly in side elevation in Fig. 5. It follows that when the rocking bar 19 is rotated by the operator through the cords or ropes 17 to control the current switch that this cam 29 is likewise rotated. Now, this cam is intended to control the brake mechanism connected with the motor, so that braking the motor and turning off the current occur at the same time, and the current is no sooner turned off than the brake is applied. A reverse operation occurs when the current is turned on because then the brake is released. A chain of mechanism proceeds from this cam to the friction wheel 4, shown in perspective in Fig. 1, in edge view partly broken away in Fig. 2, and in side elevations in Figs. 3 and 4. This friction wheel 4 may be made of any suitable material and style, but is here shown as a band wheel rigidly affixed to the motor shaft 3 by the hub and flange mechanism 5 hereinbefore described. Said cam 29 has the lever 31 working in the grooves 29' 29' of the cam and pivoted near its opposite end on shaft 32. It follows that when the said cam is rotated through the operations of the rocking bar 19 the free end of the lever travels in said grooves and is brought nearer to or farther from the axle 21, according to the degree of rotation, and the said cam may be turned in either direction with the same effect. Beyond the pivot point 32 the said lever has a head 33 which works between two set screws 34, fixed on opposite sides of said head in ears 35 of the rocking head 36, which likewise is pivoted upon the shaft 32. This rocking head 36 has a pair of short arms 37 between which is pivoted what may be termed a wedge 38, and this wedge is adapted to rest between two wheels or sheaves 39, fixed in the ends of two short levers 40. These levers are pivoted below their center at 41, and are connected at their lower ends with the ends of the friction band 42, which embraces the friction wheel 4 on the motor shaft. This friction band 42 encircles and envelops the friction wheel 4, and its ends are brought comparatively near to one another, as seen in Fig. 4. At the bottom of this friction band on the outside thereof, is a lug 43 set between two studs or posts 44, in which are set screws 45. A pin 46 projects into this stud 44 from the bottom and around the pin is a spring 47 which bears at its top against the shoulders of the studs 44. The object of this bottom mechanism is to withdraw the friction band from the friction wheel slightly when the band is relaxed, so that the weight or natural spreading of the said band is not alone relied upon to release it from the friction wheel when pressure is withdrawn. The operation of this mechanism proceeding from the cam 29 to the friction band 42 is now obvious. As the said cam 29 is rotated it moves the arm or lever 31 on its pivot 32, and this movement is transmitted through the head 33 and the set screws bearing thereon to the rock head 36, causing said head to rotate upon the shaft 32, and by reason of its arms 37 to raise or lower the wedge 38 according to the direction in which said head may be turned, and thus, by means of the reversely inclined surfaces of the wedge either tighten or release the friction band 42 on the wheel 4. In Fig. 3 the said band is shown as tightened and the wedge 38 is raised so as to spread the levers 40 at their top. In Fig. 4 the opposite position is shown and the lever 38 is down and the band 42 released from the wheel 30. By means of the set screws 34 the relation of the head 36 to the lever 31 may be adjusted and regulated so that the friction band may be tightened at one point or another more or less, according to the adjustment and the position of the cam 29, or the said set screws 34 may be so set as to give more or less play for the head 33 between the set screws.

It might occur that by oversight or accident the operator in the carriage would fail to do his duty and stop the car when the car ascends or descends to the limit of travel, and in order to provide against danger or accident on account of such possible neglect, I have provided means to prevent the same. This consists primarily in a pinion 50 secured upon the outer extremity of the shaft 10 which carries the large cable wheel and rotates positively with said cable wheel. Meshing with this pinion is a large gear wheel 51 supported upon the shaft 21, and this wheel has inward projections 52, said projections being adjustable in a curved slot in said gear wheel, which is shown here as concentric with the axis of the wheel. Then there is upon the back of the cam 29 a rib 53 which the projection 52 is adapted to engage when either limit of movement of the elevator carriage has been reached, whether at the top of the shaft or at the bottom; and the parts are so adjusted in respect to one another that when the extreme limit in either direction has been reached, and engagement has been effected between the projections 52 and the rib 53, the current is turned off and the brake is applied. This occurs automatically and certainly and will stop the machine before injury can result.

The brake band might be made in sections, if preferred, and the levers connected therewith might be operated by different mechanism than that shown and yet be within the spirit of the invention.

Having thus described my invention, what I claim is—

1. The combination, to wit: sprocket wheel 25, rocking bar 19, chain 26 connecting the bar and wheel, cam 29 movable with the rocking bar, lever 31 constructed at one end to engage and be operated by the cam, a wedge connected with the other end of said lever, levers 40 40 arranged to be engaged by the wedge, the brake wheel 4, brake band 42 connected with the levers 40 40, a projection 53 on cam 29, pinion 50, the large wheel 51 meshing with said pinion, and a pin or stud 52 on wheel 51 to engage projection 53, all constructed, arranged, and operating, substantially as set forth.

2. The combination comprising, to wit: brush 15, contacts 16 16, sprocket wheel 25, rocking bar 19, chain 26 connecting the bar and wheel, cam 29 movable with the rocking bar, lever 31 constructed at one end to engage and be operated by the cam, a wedge connected with the other end of said lever, levers 40 40 arranged to be engaged by the wedge, brake wheel 4, brake band 42 connected with the levers 40 40, all constructed, arranged, and operating, substantially as set forth.

3. The combination, to wit: shaft 14, brush 15 thereon, contacts 16 16, cam 29 having communicating grooves 29' 29' formed symmetrically with respect to the axis of the cam, means for transmitting motion between the cam and shaft 14, lever 31 constructed at one end to engage and be operated by said grooves, a wedge connected with the other end of said lever, levers 40 40 arranged to be engaged by the wedge, brake wheel 4, and brake band 42 connected with the levers 40 40, substantially as set forth.

Witness my hand to the foregoing specification.

WILLIAM C. SMITH.

Witnesses:
H. T. FISHER,
GEORGIA SCHAEFFER.